United States Patent
Han

(10) Patent No.: US 9,333,971 B1
(45) Date of Patent: May 10, 2016

(54) ADAPTIVE CRUISE CONTROL SYSTEM FOR VEHICLE USING V2V COMMUNICATION AND CONTROL METHOD THEREOF

(71) Applicant: HYUNDAI MOBIS CO., LTD., Seoul (KR)

(72) Inventor: Sang Oh Han, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/602,314

(22) Filed: Jan. 22, 2015

(30) Foreign Application Priority Data

Oct. 29, 2014 (KR) ................. 10-2014-0148366

(51) Int. Cl.
- B60T 8/32 (2006.01)
- B60T 7/12 (2006.01)
- G06F 17/10 (2006.01)
- B60W 30/16 (2012.01)

(52) U.S. Cl.
CPC .................... *B60W 30/16* (2013.01)

(58) Field of Classification Search
USPC .............................. 701/93, 96, 301
See application file for complete search history.

(56) References Cited

U.S. PATENT DOCUMENTS

| 8,396,642 | B2 | 3/2013 | Breuer | |
|---|---|---|---|---|
| 2002/0105297 | A1* | 8/2002 | Sielagoski | B60K 31/0008 318/599 |
| 2005/0125154 | A1* | 6/2005 | Kawasaki | G01D 1/16 701/301 |
| 2006/0219000 | A1* | 10/2006 | Miyoshi | B60T 8/1725 73/146 |
| 2007/0061061 | A1* | 3/2007 | Salman | B60T 8/172 701/80 |
| 2007/0067085 | A1* | 3/2007 | Lu | B60T 8/172 701/70 |
| 2007/0083318 | A1* | 4/2007 | Parikh | B60W 10/06 701/96 |
| 2007/0255481 | A1* | 11/2007 | Egawa | B60W 30/16 701/96 |
| 2009/0326752 | A1* | 12/2009 | Staempfle | G08G 1/166 701/31.4 |
| 2010/0250086 | A1* | 9/2010 | Deng | B60W 40/068 701/82 |
| 2013/0124064 | A1* | 5/2013 | Nemoto | B60K 31/0058 701/96 |
| 2013/0226431 | A1* | 8/2013 | Lu | B60W 50/0098 701/96 |
| 2014/0032094 | A1* | 1/2014 | Heinrichs-Bartscher | B60T 7/22 701/301 |

FOREIGN PATENT DOCUMENTS

| JP | 2002-331851 A | 11/2002 |
|---|---|---|
| JP | 2007-106243 A | 4/2007 |

(Continued)

*Primary Examiner* — Thomas G Black
*Assistant Examiner* — Tyler Paige
(74) *Attorney, Agent, or Firm* — NSIP Law

(57) ABSTRACT

Disclosed is an adaptive cruise control system using v2v communication and a control method thereof. The adaptive cruise control system for a vehicle using V2V communication includes: a relative distance/speed input unit receiving a relative distance and a relative speed between a recognized preceding vehicle and an own vehicle; a communication unit receiving road surface information from the recognized preceding vehicle; a constant changing unit comparing the received road surface information with road surface information received at a previous time and changing a V2V distance constant when the road surface information is changed in accordance with a result of the comparison; a target V2V distance calculation unit calculating a target V2V distance between the recognized preceding vehicle and the own vehicle based on the changed V2V distance constant; and a target acceleration calculation unit calculating the target acceleration of the own vehicle by using the received road surface information.

16 Claims, 3 Drawing Sheets

(56) References Cited

FOREIGN PATENT DOCUMENTS

| KR | 10-2003-0023007 A | 3/2003 |
|----|-------------------|--------|
| KR | 10-2007-0064490 A | 6/2007 |
| KR | 10-2010-0093672 A | 8/2010 |
| KR | 10-2011-0125122 A | 11/2011 |
| KR | 10-1102818 B1 | 1/2012 |
| KR | 10-2012-0008621 A | 2/2012 |

* cited by examiner

ADAPTIVE CRUISE CONTROL SYSTEM FOR VEHICLE USING V2V COMMUNICATION AND CONTROL METHOD THEREOF

CROSS-REFERENCE TO RELATED APPLICATIONS

This application claims priority under 35 U.S.C. §119 to Korean Patent Application No. 10-2014-0148366, filed on Oct. 29, 2014, in the Korean Intellectual Property Office, the disclosure of which is incorporated herein by reference in its entirety.

TECHNICAL FIELD

The present invention relates to an adaptive cruise control system for a vehicle using V2V communication and a control method thereof, and more particularly, to an adaptive cruise control system for a vehicle using V2V communication and a control method thereof in which a succeeding vehicle calculates a target V2V distance and a target acceleration depending on a road surface by using road surface information transmitted from a preceding vehicle through V2V communication.

BACKGROUND

With the rapid spread of a vehicle, an increase speed of the number of vehicles is significantly larger than an extension speed of a road network according to statistics.

Accordingly, as a V2V collision risk on a road increases day by day, consumer's desires for a more stable and intelligent vehicle have merged with a development progress of vehicle related industries, and as a result, various intelligent safety systems have been developed and applied.

In particular, a lot of researches have been conducted into a collision warning and avoidance between an own vehicle and a preceding vehicle and the resulting V2V distance control system can secure a more safe and fresh driving environment under a complicated road situation.

However, since there are no definite solutions for a time and a method of the collision warning and avoidance, tasks that a lot of researches and tests should be performed now and forever have been scattered.

The V2V distance control system sets a speed at which a driver intends to drive the vehicle and a control means controls a throttle actuator and a brake actuator by analyzing various load conditions which influence the vehicle and a vehicle speed to maintain driving according to the set speed.

A time gap is set, which can maintain a safe driving distance.

As described above, while the vehicle is driven at a constant speed, the control means senses a distance from the preceding vehicle by a distance sensing means installed at a predetermined front location of the vehicle to extract a relative distance and a relative speed between the own vehicle and the preceding vehicle.

When the extracted relative distance and relative speed are states of a relative distance and a relative speed having a collision risk, the set time gap is applied to perform a distance control.

The safe driving distance is calculated under a condition of (time gap×own vehicle speed).

In this case, when a threshold braking distance between the own vehicle and the preceding vehicle is arithmetically calculated and the calculated threshold braking distance is within the safe driving distance, the safe driving distance should be secured by a braking control by controlling the brake actuator or an engine torque reduction control by controlling the throttle actuator.

As described above, the speed of the own vehicle is decreased by a control for maintaining the safe driving distance, and as a result, when the relative distance between the own vehicle and the preceding vehicle increases, engine torque is restored by controlling the throttle actuator, and as a result, the speed of the own vehicle is restored to the set constant driving speed.

The V2V distance control system mounted on the vehicle in the related art cannot be controlled by the driver because the time gap for maintaining the safe driving distance is set to a predetermined value.

The driver is adapted to set the time gap in three steps (Far/Med/Close) depending on the system, but difficulty and inconvenience in the operation are accompanied in setting the time gap while driving, and as a result, safe driving is hindered.

For example, if the set time gap is 2 seconds/1.5 seconds/1 second, when the own vehicle is driven at 100 km/h, the own vehicle is driven with an interval from the preceding vehicle by 55 m/42 m/28 m.

Accordingly, when the condition is considered, a minimum stop distance of the vehicle that is driven at, for example, 100 km/h is 38 m and the distance has a higher priority than a distance (55/42/28 m) set by the driver for safety of the driver.

However, it needs to be considered that a friction coefficient between a tire and a ground surface is not continuously 1.0.

The friction coefficient between the tire and the ground surface has a feature which varies according to a state of the road surface.

The friction coefficient is large in variation even depending on a type (asphalt, concrete, an unpaved road, and the like) of road surface, a type (carcass/radial) of tire, and a tire thread shape and an aging degree.

That is, a difference in friction coefficient between the case where the vehicle is driven on the concrete with new tires on a fine day and the case where the vehicle is driven on the asphalt with old tires on a rainy day is approximately twice as much, and as a result, a difference in maximum deceleration is also twice as much.

The V2V distance control system applied to the vehicle in the related art fixes the maximum deceleration to 9.8 m/s2 under a condition in which the friction coefficient between the condition of the tire and the road surface is not sufficiently reflected at the time of calculating the minimum safety distance of the driver by considering the maximum deceleration while driving not to secure an optimal safety distance.

Accordingly, the V2V distance control system has a disadvantage that the collision between the preceding vehicle and the own vehicle cannot be avoided under an emergency situation.

SUMMARY

The present invention has been made in an effort to provide an adaptive cruise control system for a vehicle using V2V communication and a control method thereof in which a succeeding vehicle calculates a target V2V distance and a target acceleration depending on a road surface by using road surface information transmitted from a preceding vehicle through V2V communication.

The objects of the present invention are not limited to the aforementioned technical objects, and other technical objects, which are not mentioned above, will be apparent to those skilled in the art from the following description.

An exemplary embodiment of the present invention provides an adaptive cruise control system for a vehicle using V2V communication including: a relative distance/speed input unit receiving a relative distance and a relative speed between a recognized preceding vehicle and an own vehicle; a communication unit receiving road surface information from the recognized preceding vehicle; a constant changing unit comparing the received road surface information with road surface information received at a previous time and changing a V2V distance constant when the road surface information is changed in accordance with a result of the comparison; a target V2V distance calculation unit calculating a target V2V distance between the recognized preceding vehicle and the own vehicle based on the changed V2V distance constant; and a target acceleration calculation unit calculating the target acceleration of the own vehicle by using the received road surface information.

The road surface information may include a road surface friction coefficient calculated in the preceding vehicle from a relationship between acting force that acts on a tire of the recognized preceding vehicle on a vertical axis and acting force that acts on the tire on a horizontal axis.

The relative distance/speed input unit may select an object positioned within a shortest distance among one or more objects recognized by a distance sensing means mounted on the own vehicle as the preceding vehicle, and receive a relative distance and a relative speed between the selected preceding vehicle and the own vehicle.

The constant changing unit may output a V2V distance constant mapped to the road surface friction coefficient by using predetermined relationship information between a road surface friction coefficient and the V2V distance constant.

The target V2V distance calculation unit may calculate a target V2V distance of the own vehicle by using Equation 1 given below.

$$C_{des} = \tau v_x + C_0 \quad \text{[Equation 1]}$$

Where, the $C_{des}$ represents a target V2V distance, $\tau$ represents a V2V distance constant, and $C_0$ represents a minimum V2V distance.

The target acceleration calculation unit may calculate a target acceleration of the own vehicle by using Equation 2 given below.

$$a_{des} = -k_1(C_{des} - c) - k_2(v_\tau - v_s) \quad \text{[Equation 2]}$$

Where, the $a_{des}$ represents the target acceleration, the $k_1$, $k_2$ represents a gain value depending on the road surface friction coefficient, $C_{des}$ represents the target V2V distance, c represents a current V2V distance, $v_\tau$ represents the speed of the preceding vehicle, $v_s$ and represents the speed of the own vehicle.

The system may further include a vehicle control unit calculating an error between the target acceleration and a current acceleration and calculating a control value for compensating for the acceleration error.

The system may further include a display unit displaying the changed content of the road surface information.

Another exemplary embodiment of the present invention provides an adaptive cruise control method for a vehicle using V2V communication including: (a) receiving a relative distance and a relative speed between a recognized preceding vehicle and an own vehicle; (b) receiving road surface information from the recognized preceding vehicle; (c) comparing the received road surface information with road surface information received at a previous time and changing a V2V distance constant when the road surface information is changed in accordance with a result of the comparison; (d) calculating a target V2V distance between the recognized preceding vehicle and the own vehicle based on the changed V2V distance constant; and (e) calculating the target acceleration of the own vehicle by using the received road surface information.

According to exemplary embodiments of the present invention, a road surface friction coefficient calculated in a preceding vehicle is transferred to a succeeding vehicle through V2V communication and the succeeding vehicle calculates a target acceleration and a control amount depending on the received road surface friction coefficient to support securing of a safety distance depending on a road surface.

Other features and aspects will be apparent from the following detailed description, the drawings, and the claims.

DETAILED DESCRIPTION OF EMBODIMENTS

Figure 1:
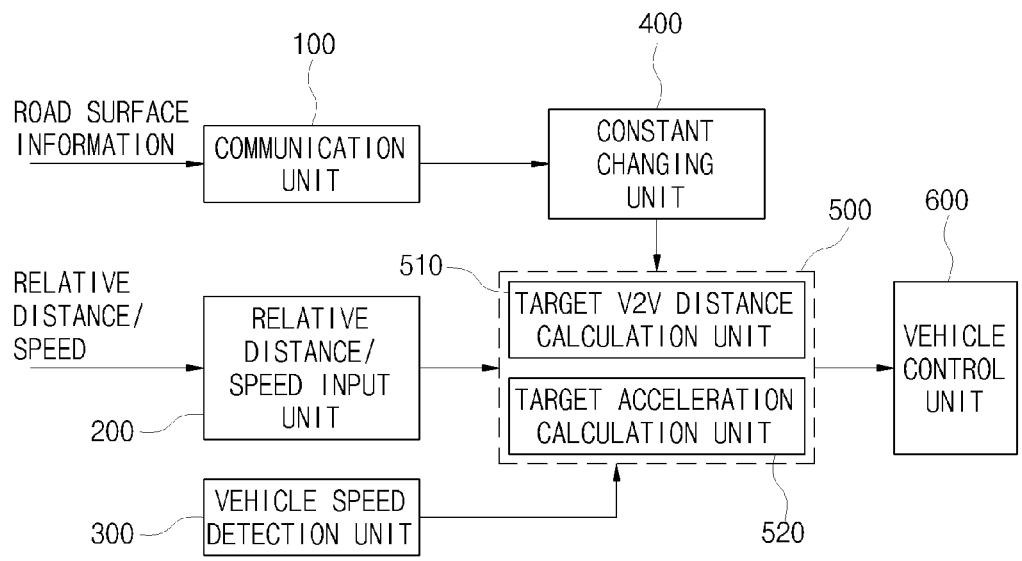
FIG. 1 is a block configuration diagram illustrating an adaptive cruise control system for a vehicle using V2V communication according to an exemplary embodiment of the present invention.

Various advantages and features of the present invention and methods accomplishing them will become apparent from embodiments described below in detail with reference to the accompanying drawings. However, the present invention is not limited to exemplary embodiments to be disclosed below, but various forms different from each other may be implemented. The exemplary embodiments are merely intended to make the disclosure of the present invention complete and to completely notify the person with ordinary skill in the art, to which the present invention belongs, of the scope of the invention, and the present invention is defined by the disclosure of the claims. Meanwhile, the terms used in the present specification are for explaining the embodiments rather than limiting the present invention. Unless particularly stated otherwise in the present specification, a singular form also includes a plural form. The meaning of "comprises" or "comprising" used in this specification does not exclude the existence or addition of one or more other constituent elements, steps, operations, and/or devices in addition to aforementioned constituent elements, steps, operations, and/or device.

Hereinafter, exemplary embodiments of the present invention will be described in detail with reference to the accompanying drawings. First, in affixing reference numerals to constituent elements of each drawing, the same reference numerals refer to the constituent elements as possible even though the constituent elements are illustrated in other drawings and further, in describing the present invention, when a detailed description of related known configurations and functions may make the spirit of the present invention ambiguous, a detailed description thereof will be omitted.

An adaptive cruise control system for a vehicle using V2V communication according to an exemplary embodiment of the present invention receives information indicating that a change of a road surface is sensed from a preceding vehicle through V2V communication and controls a V2V distance by considering the received information.

For example, the adaptive cruise control system changes a V2V distance constant and calculates a target acceleration based on the road surface information received from the preceding vehicle through the V2V communication, and a relative speed and a relative distance input from a distance sensing means such as a scanner to control the V2V distance for securing a safety distance. A detailed exemplary embodiment therefor will be described with reference to FIGS. 1 to 4.

FIG. 1 is a block configuration diagram illustrating an adaptive cruise control system for a vehicle using V2V communication according to an exemplary embodiment of the present invention.

Referring to FIG. 1, an adaptive distance control system for a vehicle using V2V communication according to the exemplary embodiment of the present invention is configured to include a communication unit 100, a relative distance/speed input unit 200, a vehicle speed detection unit 300, a constant changing unit 400, a calculation unit 500, and a vehicle control unit 600.

The communication unit 100 supports vehicle to vehicle (V2V) communication with another vehicle. The communication unit 100 supports a network connection configuration so as to form a network with a communication module of another vehicle that comes close within predetermined communication coverage.

The communication unit 100 may include a gateway that converts V2V protocol transmission data into in-vehicle network (for example, CAN, FlexRay, MOST, Ethernet, and the like) protocol data, in order to transmit data transmitted from another vehicle to another unit in the vehicle through a V2V communication protocol.

The communication unit 100 receives road surface information including the road surface friction coefficient from another vehicle (for example, a preceding vehicle) that comes close within the communication coverage through the V2V communication.

Herein, the road surface friction coefficient may be calculated from a relationship between acting force that acts on a tire of each vehicle wheel on a horizontal axis and acting force that acts on the tire of each vehicle wheel on a vertical axis. The road surface friction coefficient calculated in the preceding vehicle is transmitted to a succeeding vehicle (hereinafter, referred to as an own vehicle) through the V2V communication.

The relative distance/speed input unit 200 receives a relative distance and a relative speed between a recognized preceding vehicle and the own vehicle.

For example, the relative distance/speed input unit 200 may select as the preceding vehicle an object positioned within a shortest distance among one or more objects recognized by a distance sensing means such as a laser scanner mounted on the own vehicle, or the like. In this case, the relative speed and the relative distance between the object selected as the preceding vehicle and the own vehicle are input.

The vehicle speed detection unit 300 as a vehicle speed sensor mounted on an output shaft of a transmission detects a current driving vehicle speed from an RPM of the output shaft. As another example, the vehicle speed detection unit 300 as a wheel speed sensor mounted on each wheel detects a speed of a corresponding vehicle wheel from an angular speed for each vehicle wheel.

The constant changing unit 400 compares the received road surface information and road surface information received at a previous time, and as a result, when the road surface information is changed, the constant changing unit 400 changes a V2V distance constant.

Figure 2:
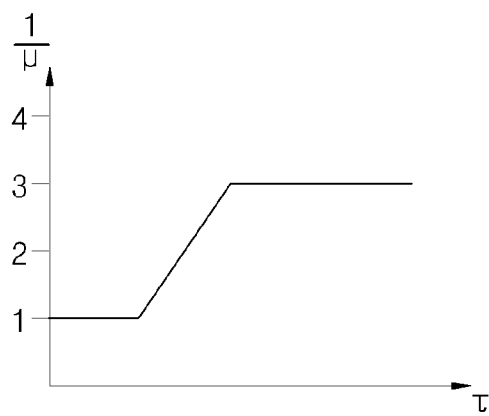
FIG. 2 is a diagram illustrating a relationship between a road surface friction coefficient and a V2V distance constant according to the exemplary embodiment of the present invention.

For example, the constant changing unit 400 outputs the V2V distance constant mapped to the road surface friction coefficient by using predetermined relationship information between the road surface friction coefficient and the V2V distance constant. In FIG. 2, the relationship between the road surface friction coefficient and the V2V distance constant is exemplarily illustrated.

Figure 3:
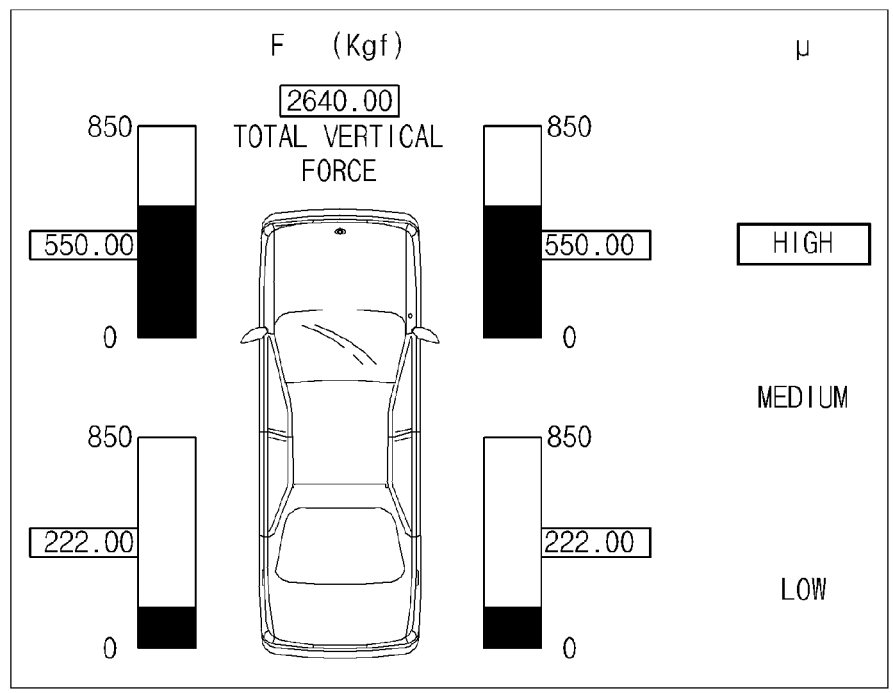
FIG. 3 is a diagram illustrating one example in which changed contents of road surface information is displayed according to the exemplary embodiment of the present invention.
Figure 3:
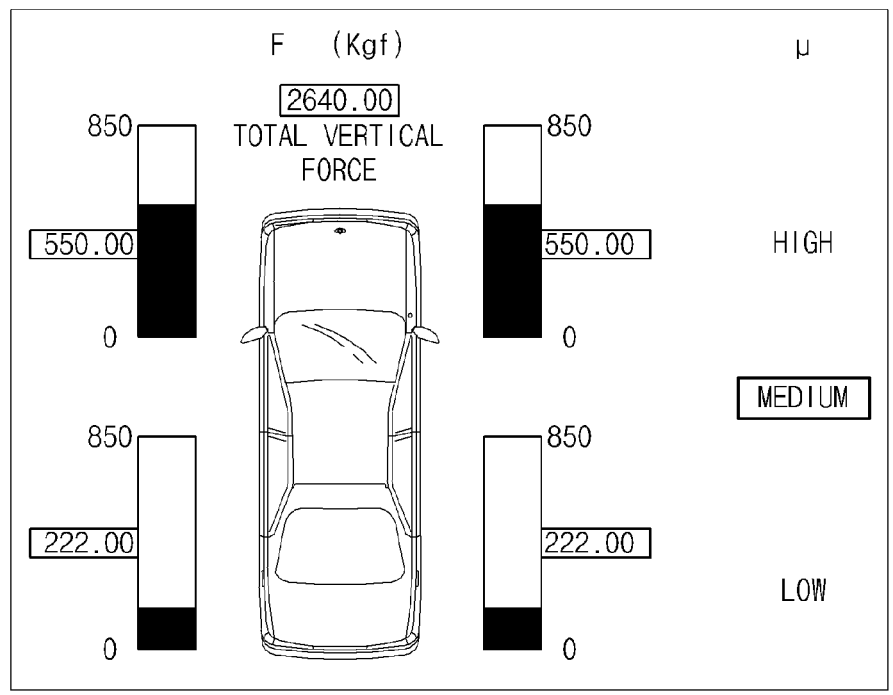

Meanwhile, when the constant changing unit 400 determines that the received road surface information is changed, the changed road surface information is transferred and display onto a display unit (not illustrated). FIG. 3 is a diagram illustrating one example in which changed contents of road surface information is displayed according to the exemplary embodiment of the present invention.

The calculation unit 500 calculates a target acceleration of the own vehicle by using the V2V distance constant changed by the constant changing unit 400, a relative speed and a relative distance with the preceding vehicle, which is input into the relative distance/speed input unit 200, and a current driving speed of the own vehicle, which is input into the vehicle speed detection unit 300.

To this end, the calculation unit 500 is constituted by a target V2V distance calculation unit 510 and a target acceleration calculation unit 520.

The target V2V distance calculation unit 510 calculates a target V2V distance between the preceding vehicle and the own vehicle recognized based on the changed V2V distance constant.

In this case, the target V2V distance calculation unit 510 may calculate the target V2V distance of the own vehicle by using Equation 1 given below.

$$C_{des} = \tau v_x + C_0 \quad \text{[Equation 1]}$$

Where, the $C_{des}$ represents a target V2V distance, $\tau$ represents a V2V distance constant, and $C_0$ represents a minimum V2V distance.

The target acceleration calculation unit 520 calculates the target acceleration of the own vehicle by using the received road surface information.

In this case, the target acceleration calculation unit 520 calculates the target acceleration of the own vehicle by using the relative distance and the relative speed between the preceding vehicle and the own vehicle, which are input into the relative distance/speed input unit 200, the target V2V distance calculated by the target V2V distance calculation unit 510, and a driving speed of a current vehicle, which is input into the vehicle speed detection unit 300.

Equation 2 given below is an equation used to calculate the target acceleration in the target acceleration calculation unit 520.

$$a_{des} = -k_1(C_{des} - c) - k_2(v_\tau - v_s) \quad \text{[Equation 2]}$$

Here, the $a_{des}$ represents the target acceleration, the $k_1$, $k_2$ represents a gain value depending on the road surface friction coefficient, $C_{des}$ represents the target V2V distance, c represents a current V2V distance, $v_\tau$ represents the speed of the preceding vehicle, and $v_s$ represents the speed of the own vehicle.

The vehicle control unit 600 calculates an error between the target acceleration and the current acceleration of the own vehicle and calculates a control value for compensating for the acceleration error.

Hereinafter, an adaptive cruise control method for a vehicle using V2V communication according to the exemplary embodiment will be described with reference to FIGS. 1 to 4.

Figure 4:
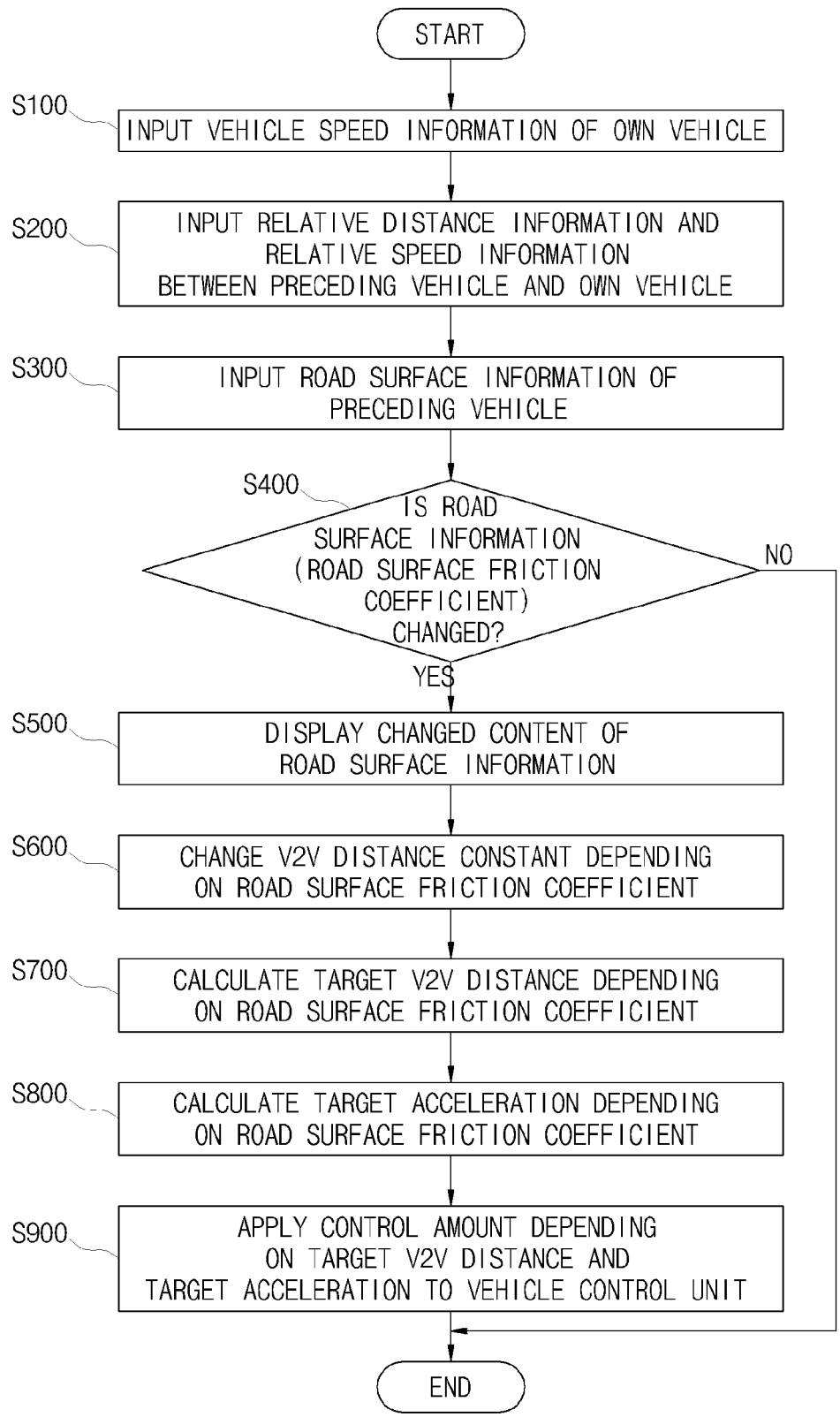
FIG. 4 is a flowchart illustrating an adaptive cruise control method for a vehicle using V2V communication according to another exemplary embodiment of the present invention.

FIG. 4 is a flowchart illustrating an adaptive cruise control method for a vehicle using V2V communication according to another exemplary embodiment of the present invention.

First, the vehicle speed detection unit 300 detects a current driving speed of the own vehicle (S100).

As one example, the vehicle speed detection unit 300 as a vehicle speed sensor mounted on an output shaft of a transmission detects a current driving vehicle speed from an RPM of the output shaft. As another example, the vehicle speed detection unit 300 as a wheel speed sensor mounted on each wheel detects a speed of a corresponding vehicle wheel from an angular speed for each vehicle wheel.

And the relative distance/speed input unit 200 receives a relative distance and a relative speed between a recognized preceding vehicle and the own vehicle (S200).

For example, the relative distance/speed input unit 200 may select as the preceding vehicle an object positioned within a shortest distance among one or more objects recognized by a distance sensing means such as a laser scanner mounted on the own vehicle, or the like. In this case, the relative speed and the relative distance between the object selected as the preceding vehicle and the own vehicle are input.

Next, the communication unit 100 receives road surface information including the road surface friction coefficient from another vehicle (for example, a preceding vehicle) that comes close within the communication coverage through the V2V communication (S300).

The constant changing unit 400 compares the received road surface information with road surface information received at a previous time (S400).

According to a result of the comparison, when it is determined that the received road surface information is changed, the changed road surface information is transferred and displayed onto a display unit (not illustrated) (S500).

The constant changing unit 400 changes the V2V distance constant based on the changed road surface information (S600).

For example, the constant changing unit 400 outputs the V2V distance constant mapped to the road surface friction coefficient by using predetermined relationship information between the road surface friction coefficient and the V2V distance constant. In FIG. 2, the relationship between the road surface friction coefficient and the V2V distance constant is exemplarily illustrated.

Next, the target V2V distance calculation unit 510 calculates a target V2V distance between the preceding vehicle and the own vehicle recognized based on the changed V2V distance constant (S700).

In this case, the target V2V distance calculation unit 510 may calculate the target V2V distance of the own vehicle by using Equation 1 given below.

$$C_{des} = \tau v_x + C_0 \qquad [\text{Equation 1}]$$

Where, the $C_{des}$ represents a target V2V distance, $\tau$ represents a V2V distance constant, and $C_0$ represents a minimum V2V distance.

Next, the target acceleration calculation unit 520 calculates the target acceleration of the own vehicle by using the received road surface information (S800).

In this case, the target acceleration calculation unit 520 calculates the target acceleration of the own vehicle by using the relative distance and the relative speed between the preceding vehicle and the own vehicle, which are input into the relative distance/speed input unit 200, the target V2V distance calculated by the target V2V distance calculation unit 510, and a driving speed of a current vehicle, which is input into the vehicle speed detection unit 300.

Equation 2 given below is an equation used to calculate the target acceleration in the target acceleration calculation unit 520.

$$a_{des} = -k_1(C_{des} - c) - k_2(v_\tau - v_s) \qquad [\text{Equation 2}]$$

Where, the $a_{des}$ represents the target acceleration, the $k_1$, $k_2$ represents a gain value depending on the road surface friction coefficient, $C_{des}$ represents the target V2V distance, c represents a current V2V distance, $v_\tau$ represents the speed of the preceding vehicle, and $v_s$ represents the speed of the own vehicle.

Next, the vehicle control unit 600 calculates an error between the target acceleration and the current acceleration of the own vehicle and calculates a control value for compensating for the acceleration error (S900).

Those skilled in the art will be able to understand that the present disclosure can be implemented in other detailed forms without changing the technical spirit or an essential characteristic. Therefore, it should be appreciated that the embodiments described above are exemplificative in all aspects but not limitative. The protection scope of the present invention is described by the appended claims to be described below rather than the detailed description and it should be appreciated that the claims and all changes and modified forms derived from the equivalent thereto are included in the scope of the present invention.

What is claimed is:

1. An adaptive cruise control system for a vehicle using vehicle-to-vehicle (V2V) communication, the system comprising:
   a relative distance/speed input receiver configure to receive a relative distance and a relative speed between a recognized preceding vehicle and an own vehicle;
   a communication receiver configure to receive road surface information from the recognized preceding vehicle;
   a constant changer configured to compare the received road surface information with road surface information received at a previous time and change a V2V distance constant when the road surface information is changed in accordance with a result of the comparison;
   a target V2V distance calculator configured to calculate a target V2V distance between the recognized preceding vehicle and the own vehicle based on a summation of a minimum V2V distance and a product of a V2V distance constant; and
   a target acceleration calculator configured to calculate the target acceleration of the own vehicle by using the received road surface information.

2. The system of claim 1, wherein the road surface information includes a road surface friction coefficient calculated in the preceding vehicle from a relationship between acting force that acts on a tire of the recognized preceding vehicle on a vertical axis and acting force that acts on the tire on a horizontal axis.

3. The system of claim 1, wherein the relative distance/speed input receiver selects an object positioned within a shortest distance among one or more objects recognized by a distance sensing means mounted on the own vehicle as the preceding vehicle, and receives a relative distance and a relative speed between the selected preceding vehicle and the own vehicle.

4. The system of claim 1, wherein the constant changer outputs a V2V distance constant mapped to the road surface friction coefficient by using predetermined relationship information between a road surface friction coefficient and the V2V distance constant.

5. The system of claim 1, wherein the target V2V distance calculator calculates a target V2V distance of the own vehicle by using Equation 1 given below:

$$C_{des} = \tau v_x + C_0 \qquad \text{[Equation 1]}$$

Where, the $C_{des}$ represents a target V2V distance, $\tau$ represents a V2V distance constant, and $C_0$ represents a minimum V2V distance.

6. The system of claim 1, wherein the target acceleration calculator calculates a target acceleration of the own vehicle by using Equation 2 given below:

$$a_{des} = -k_1(C_{des} - c) - k_2(v_\tau - v_s) \qquad \text{[Equation 2]}$$

Where, the $a_{des}$ represents the target acceleration, the $k_1$, $k_2$ represents a gain value depending on the road surface friction coefficient, $C_{des}$ represents the target V2V distance, c represents a current V2V distance, $v_\tau$ represents the speed of the preceding vehicle, and $v_s$ represents the speed of the own vehicle.

7. The system of claim 1, further comprising:
a vehicle control calculator configured to calculate an error between the target acceleration and a current acceleration and to calculate a control value for compensating for the acceleration error.

8. The system of claim 1, further comprising:
a display configured to display the changed content of the road surface information.

9. An adaptive cruise control method for a vehicle using a vehicle-to-vehicle (V2V) communication, the method comprising:
(a) receiving a relative distance and a relative speed between a recognized preceding vehicle and an own vehicle;
(b) receiving road surface information from the recognized preceding vehicle;
(c) comparing the received road surface information with road surface information received at a previous time and changing a V2V distance constant when the road surface information is changed in accordance with a result of the comparison;
(d) calculating a target V2V distance between the recognized preceding vehicle and the own vehicle based on a summation of a minimum V2V distance and a product of a V2V distance; and
(e) calculating the target acceleration of the own vehicle by using the received road surface information.

10. The method of claim 9, wherein step (a) includes selecting an object positioned within a shortest distance among one or more objects recognized by a distance sensing means mounted on the own vehicle as the preceding vehicle and receiving a relative distance and a relative speed between the selected preceding vehicle and the own vehicle.

11. The method of claim 9, wherein the road surface information includes a road surface friction coefficient calculated in the preceding vehicle from a relationship between acting force that acts on a tire of the recognized preceding vehicle on a vertical axis and acting force that acts on the tire on a horizontal axis.

12. The method of claim 9, wherein step (c) includes outputting a V2V distance constant mapped to the road surface friction coefficient by using predetermined relationship information between a road surface friction coefficient and the V2V distance constant.

13. The method of claim 9, wherein in step (d),
a target V2V distance of the own vehicle is calculated by using Equation 1 given below:

$$C_{des} = \tau v_x + C_0 \qquad \text{[Equation 1]}$$

Where, the $C_{des}$ represents a target V2V distance, $\tau$ represents a V2V distance constant, and $C_0$ represents a minimum V2V distance.

14. The method of claim 9, wherein in step (e),
a target acceleration of the own vehicle is calculated by using Equation 2 given below:

$$a_{des} = -k_1(C_{des} - c) - k_2(v_\tau - v_s) \qquad \text{[Equation 2]}$$

Where, the $a_{des}$ represents the target acceleration, the $k_1$, $k_2$ represents a gain value depending on the road surface friction coefficient, $C_{des}$ represents the target V2V distance, c represents a current V2V distance, $v_\tau$ represents the speed of the preceding vehicle, and $v_s$ represents the speed of the own vehicle.

15. The method of claim 9, further comprising:
(f) calculating an error between the target acceleration and a current acceleration and calculating a control value for compensating for the acceleration error.

16. The method of claim 9, further comprising:
(g) displaying the changed contents of the road surface information.

* * * * *